United States Patent
Ono et al.

(10) Patent No.: US 8,742,881 B2
(45) Date of Patent: Jun. 3, 2014

(54) ELECTRONIC COMPONENT

(71) Applicant: Murata Manufacturing Co., Ltd., Kyoto-fu (JP)

(72) Inventors: Akihiro Ono, Kyoto-fu (JP); Mitsuru Odahara, Kyoto-fu (JP); Hideaki Matsushima, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 13/693,999

(22) Filed: Dec. 4, 2012

(65) Prior Publication Data

US 2013/0093558 A1    Apr. 18, 2013

Related U.S. Application Data

(63) Continuation of application No. PCT/JP2011/056195, filed on Mar. 16, 2011.

(30) Foreign Application Priority Data

Jun. 11, 2010 (JP) ................. 2010-133918

(51) Int. Cl.
- *H01F 5/00* (2006.01)
- *H01F 27/29* (2006.01)
- *H01F 27/28* (2006.01)
- *H01F 27/24* (2006.01)

(52) U.S. Cl.
USPC ............ 336/200; 336/192; 336/232; 336/234

(58) Field of Classification Search
USPC .................................. 336/200, 192, 232, 234
See application file for complete search history.

(56) References Cited

U.S. PATENT DOCUMENTS

| | | | | |
|---|---|---|---|---|
| 6,480,083 | B1* | 11/2002 | Toi et al. | 336/192 |
| 6,922,129 | B2* | 7/2005 | Aoyagi | 336/200 |
| 7,719,398 | B2* | 5/2010 | Tsuzuki | 336/200 |
| 7,808,358 | B2* | 10/2010 | Nakamura et al. | 336/200 |
| 7,928,823 | B2* | 4/2011 | Tatsukawa et al. | 336/200 |

(Continued)

FOREIGN PATENT DOCUMENTS

| | | |
|---|---|---|
| JP | 05-029173 A | 2/1993 |
| JP | 11-067554 A | 3/1999 |

(Continued)

OTHER PUBLICATIONS

International Search Report; PCT/JP2011/056195; Jun. 21, 2011.

(Continued)

*Primary Examiner* — Elvin G Enad
*Assistant Examiner* — Kazi Hossain
(74) *Attorney, Agent, or Firm* — Studebaker & Brackett PC (57) ABSTRACT

An electronic component that can be prevented from being shifted from a normal mount position and can be manufactured with a low cost is provided. The component is configured by stacking a plurality of insulating layers and a plurality of inner conductors provided on the respective insulating layers. The connection conductors have respective exposure portions that are each exposed between corresponding ones of the insulating layers at a surface of the stack. An outer electrode is formed, for example, by plating on the lower surface so that the exposure portions are covered with the outer electrode. The plurality of exposure portions do not have uniform thicknesses or are not arranged at uniform intervals in the stacking direction.

11 Claims, 7 Drawing Sheets

(56) References Cited

U.S. PATENT DOCUMENTS

| | | | |
|---|---|---|---|
| 8,441,333 B2* | 5/2013 | Chiu et al. | 336/200 |
| 8,514,049 B2* | 8/2013 | Sugiyama et al. | 336/200 |
| 2007/0025054 A1 | 2/2007 | Tonogai et al. | |
| 2008/0123248 A1 | 5/2008 | Kunishi et al. | |
| 2008/0257488 A1* | 10/2008 | Yamano | 156/272.4 |
| 2009/0316330 A1* | 12/2009 | Taniguchi et al. | 361/306.3 |
| 2010/0243133 A1 | 9/2010 | Kunishi et al. | |
| 2010/0328009 A1* | 12/2010 | Tawa | 336/200 |

FOREIGN PATENT DOCUMENTS

| | | |
|---|---|---|
| JP | 2000-348939 A | 12/2000 |
| JP | 2002-367833 A | 12/2002 |
| JP | 2006-147901 A | 6/2006 |
| JP | 2007-042743 A | 2/2007 |
| JP | 2010-003891 A | 1/2010 |
| WO | 2007/049456 A1 | 5/2007 |

OTHER PUBLICATIONS

Japanese Office Action "Notification of Reasons for Refusal" dated Jun. 27, 2013, which corresponds to Japanese Patent Application No. 2012-519293 and is related to U.S. Appl. No. 13/693,999, with translation.

* cited by examiner

ELECTRONIC COMPONENT

CROSS REFERENCE TO RELATED APPLICATIONS

The present application claims priority to International Application No. PCT/JP2011/056195 filed on Mar. 16, 2011, and to Japanese Patent Application No. 2010-133918 filed on Jun. 11, 2010, the entire contents of each of these applications being incorporated herein by reference in their entirety.

TECHNICAL FIELD

The technical field relates to electronic components, and more particularly relates to an electronic component including a stack and an outer electrode.

BACKGROUND

As a conventional electronic component, for example, an electronic component described in Japanese Unexamined Patent Application Publication No. 5-29173 (Patent Document 1) is known. The electronic component includes a body and outer electrodes. The body is embedded with a circuit element and has a rectangular-parallelepiped shape. The outer electrodes are provided so that both ends in the longitudinal direction of the body are covered with the outer electrodes. Each of the outer electrodes is provided with a groove in its surface. With the electronic component described in Patent Document 1, the surface area of the outer electrodes is increased, and hence a component holding force provided by adhesion of solder cream is increased. As the result, the electronic component is prevented from being shifted from a normal mount position in a period from a mounting step to a reflowing step.

SUMMARY

The present disclosure provides an electronic component that can be prevented from being shifted from a normal mount position and can be manufactured with a low cost.

An electronic component according to an aspect of the disclosure includes a stack configured by stacking a plurality of insulating layers, a plurality of inner conductors provided on the respective insulating layers and having respective exposure portions that are each exposed between the corresponding insulating layers at a surface of the stack, and an outer electrode on the surface covering the exposure portions. The plurality of exposure portions do not have uniform thicknesses or are not arranged at uniform intervals in a stacking direction.

DETAILED DESCRIPTION

The inventors realized that the electronic component described in Patent Document 1 has a problem of an increase in manufacturing cost. With the electronic component, a pattern of a meshlike mold is transferred to the outer electrodes after the outer electrodes are formed. Hence, a processing step for the outer electrodes is required after the outer electrodes are formed. As the result, with the electronic component, the number of manufacturing steps is increased, and the manufacturing cost is increased.

Electronic components according to exemplary embodiments of the present disclosure that can address the above shortcomings will now described with reference to the drawings.

Figure 1:
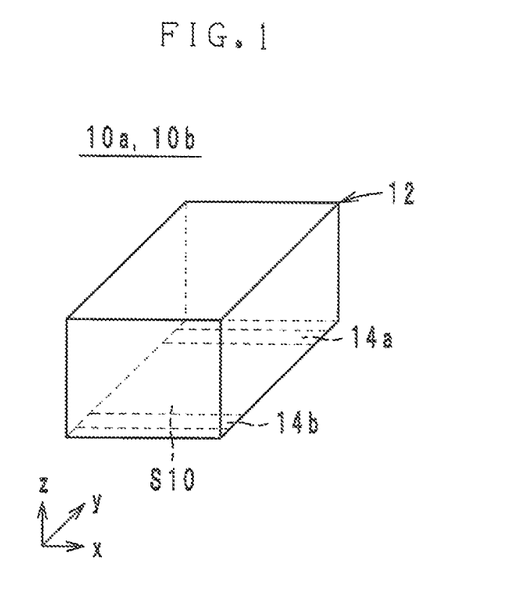
FIG. 1 is an external perspective view of an electronic component according to a first exemplary embodiment.
Figure 2:
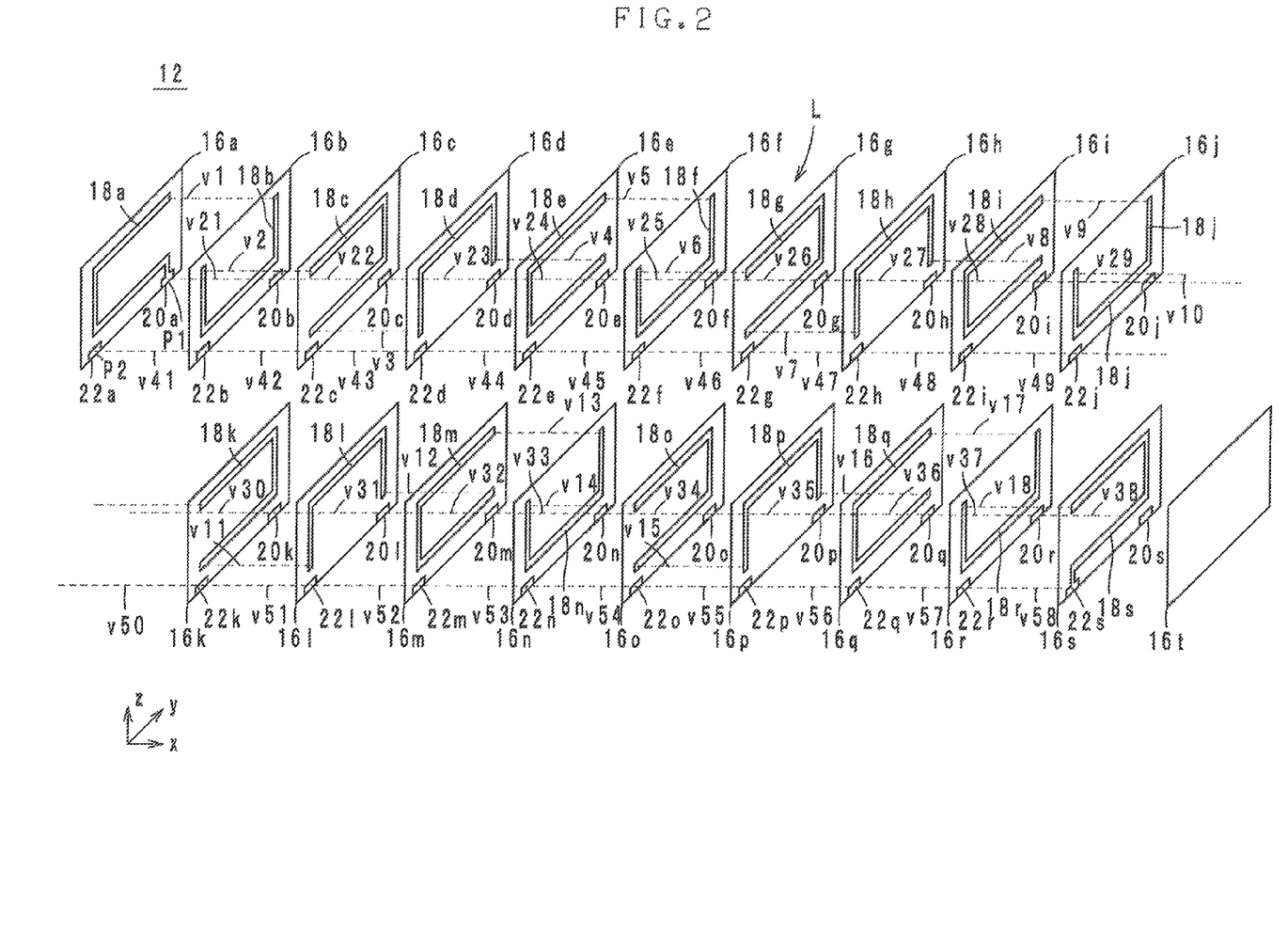
FIG. 2 is an exploded perspective view of a stack of the electronic component according to the first exemplary embodiment.

An electronic component $10a$ according to a first exemplary embodiment is shown in FIGS. 1 and 2. FIG. 1 is an external perspective view of the electronic component $10a$, and FIG. 2 is an exploded perspective view of a stack 12 of the electronic component $10a$. Hereinafter, a stacking direction of the electronic component $10a$ is defined as an x-axis direction, and in plan view in the x-axis direction, a direction extending along the short side of the electronic component $10a$ is defined as a z-axis direction, and a direction extending along the long side of the electronic component $10a$ is defined as a y-axis direction. The x axis, y axis, and z axis are orthogonal to one another.

As shown in FIGS. 1 and 2, the electronic component $10a$ includes the stack, or body 12, outer electrodes $14a$, $14b$, which are sometimes collectively referred to herein as electrodes 14, connection conductors (i.e., inner conductors) $20a$ to $20s$ and $22a$ to $22s$, which are sometimes collectively referred to herein as connection conductors 20 and 22, respectively, a coil L, and via-hole conductors $v21$ to $v38$ and $v41$ to $v58$.

The stack 12 has a rectangular-parallelepiped shape, and is embedded with the connection conductors 20 and 22, the coil L, and the via-hole conductors $v21$ to $v38$ and $v41$ to $v58$. Hereinafter, a surface at the negative side in the z-axis direction of the stack 12 is defined as a lower surface S10. The lower surface S10 is a mount surface, and faces a circuit board when the electronic component $10a$ is mounted on the circuit board. The lower surface S10 is a surface parallel to the x-axis direction.

As shown in FIG. 2, the stack 12 is configured by stacking insulating layers $16a$ to $16t$, which are collectively referred to as insulating layers 16, in that order from the negative side to the positive side in the x-axis direction. The insulating layers 16 each have a rectangular shape, and are each fabricated with a magnetic material. Hereinafter, a surface at the positive side in the x-axis direction of each insulating layer 16 is referred to as front surface, and a surface at the negative side in the x-axis direction of each insulating layer 16 is referred to as back surface. However, it is to be understood that terms used herein describing orientation, such as front, back etc. are provided for the sake of describing depicted embodiments, and that an orientation of a component can be described from any of plural different arbitrary viewpoints.

As shown in FIG. 2, the coil L is configured by coil conductors (i.e., inner conductors) 18a to 18s, which are sometimes collectively referred to herein as coil conductors 18, and via-hole conductors v1 to v18. That is, the coil L is configured such that the coil conductors 18a to 18s are connected in series by the via-hole conductors v1 to v18. The coil L has a coil axis extending in the x-axis direction. The coil L has a helix shape extending from the negative side to the positive side in the x-axis direction while turning clockwise.

As shown in FIG. 2, the coil conductors 18a to 18s are provided on the front surfaces of the insulating layers 16a to 16s, respectively. The coil conductors 18a to 18s are each formed of a conductive material, and each have a number of turns being ¾ turn. In addition, the coil conductors 18a to 18s each have a shape in which a linear conductor is bent. That is, the coil conductors 18a to 18s each have a shape in which part (¼) of a rectangular ring-shaped conductor is cut. Hereinafter, regarding the coil conductors 18a to 18s, an end at the upstream side in the clockwise direction is called upstream end, and an end at the downstream side in the clockwise direction is called downstream end.

The via-hole conductors v1 to v18 penetrate through the insulating layers 16b to 16s in the x-axis direction, respectively, and connect the coil conductors 18a to 18s in series. To be more specific, the via-hole conductor v1 connects the downstream end of the coil conductor 18a to the upstream end of the coil conductor 18b. The via-hole conductor v2 connects the downstream end of the coil conductor 18b to the upstream end of the coil conductor 18c. The via-hole conductor v3 connects the downstream end of the coil conductor 18c to the upstream end of the coil conductor 18d. The via-hole conductor v4 connects the downstream end of the coil conductor 18d to the upstream end of the coil conductor 18e. The via-hole conductor v5 connects the downstream end of the coil conductor 18e to the upstream end of the coil conductor 18f. The via-hole conductor v6 connects the downstream end of the coil conductor 18f to the upstream end of the coil conductor 18g. The via-hole conductor v7 connects the downstream end of the coil conductor 18g to the upstream end of the coil conductor 18h. The via-hole conductor v8 connects the downstream end of the coil conductor 18h to the upstream end of the coil conductor 18i. The via-hole conductor v9 connects the downstream end of the coil conductor 18i to the upstream end of the coil conductor 18j. The via-hole conductor v10 connects the downstream end of the coil conductor 18j to the upstream end of the coil conductor 18k. The via-hole conductor v11 connects the downstream end of the coil conductor 18k to the upstream end of the coil conductor 18l. The via-hole conductor v12 connects the downstream end of the coil conductor 18l to the upstream end of the coil conductor 18m. The via-hole conductor v13 connects the downstream end of the coil conductor 18m to the upstream end of the coil conductor 18n. The via-hole conductor v14 connects the downstream end of the coil conductor 18n to the upstream end of the coil conductor 18o. The via-hole conductor v15 connects the downstream end of the coil conductor 18o to the upstream end of the coil conductor 18p. The via-hole conductor v16 connects the downstream end of the coil conductor 18p to the upstream end of the coil conductor 18q. The via-hole conductor v17 connects the downstream end of the coil conductor 18q to the upstream end of the coil conductor 18r. The via-hole conductor v18 connects the downstream end of the coil conductor 18r to the upstream end of the coil conductor 18s.

The connection conductors 20a to 20s are rectangular conductive layers provided on the front surfaces of the insulating layers 16a to 16s, respectively, such that the connection conductors 20a to 20s are adjacent to the respective long sides at the negative side in the z-axis direction. Hence, the connection conductors 20a to 20s each have an exposure portion P1 that is exposed between the corresponding insulating layers 16 at the lower surface S10 of the stack 12. In FIG. 2, a reference sign is applied only to the exposure portion P1 of the connection conductor 20a for simplifying illustration.

Also, the connection conductors 20a to 20s are superposed on one another in an aligned manner in plan view in the x-axis direction. Accordingly, when the insulating layers 16 are stacked, the connection conductors 20a to 20s are exposed from the lower surface S10 within a rectangular region. Further, as shown in FIG. 2, the connection conductor 20a is connected to the upstream end of the coil conductor 18a.

The via-hole conductors v21 to v38 penetrate through the insulating layers 16b to 16s in the x-axis direction, respectively, and are connected to one another, thereby configuring a single via-hole conductor. As shown in FIG. 2, the via-hole conductors v21 to v38 connect the connection conductors 20a to 20s.

The connection conductors 22a to 22s are located at the negative side in the y-axis direction with respect to the connection conductors 20a to 20s, respectively. The connection conductors 22a to 22s are rectangular conductive layers provided on the front surfaces of the insulating layers 16a to 16s, respectively, such that the connection conductors 22a to 22s are adjacent to the respective long sides at the negative side in the z-axis direction. Hence, the connection conductors 22a to 22s each have an exposure portion P2 that is exposed between the corresponding insulating layers 16 at the lower surface S10 of the stack 12. In FIG. 2, a reference sign is applied only to the exposure portion P2 of the connection conductor 22a for simplifying illustration.

Also, the connection conductors 22a to 22s are superposed on one another in an aligned manner in plan view in the x-axis direction. Accordingly, when the insulating layers 16 are stacked, the connection conductors 22a to 22s are exposed from the lower surface S10 within the rectangular region. Further, as shown in FIG. 2, the connection conductor 22s is connected to the downstream end of the coil conductor 18s.

The via-hole conductors v41 to v58 penetrate through the insulating layers 16b to 16s in the x-axis direction, respectively, and are connected in series, thereby configuring a single via-hole conductor. As shown in FIG. 2, the via-hole conductors v41 to v58 connect the connection conductors 22a to 22s.

As shown in FIG. 1, the outer electrodes 14a and 14b are provided on the lower surface S10 of the stack 12 to be arranged in the y-axis direction. The outer electrode 14b is provided at the negative side in the y-axis direction with respect to the outer electrode 14a. The outer electrode 14a is a rectangular conductor formed on the lower surface S10 by plating so that the exposure portions P1 of the connection conductors 20a to 20s in FIG. 2 are covered with the outer electrode 14a. The outer electrode 14b is a rectangular conductor formed on the lower surface S10 by plating so that the exposure portions P2 of the connection conductors 22a to 22s in FIG. 2 are covered with the outer electrode 14b.

Figure 3:
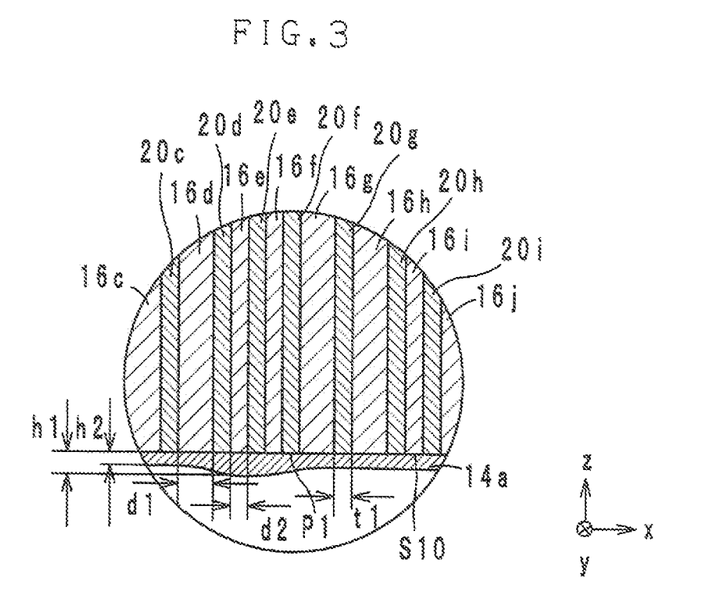
FIG. 3 is a sectional structure diagram of an outer electrode.

The outer electrodes 14a and 14b are each provided with irregularities in the respective surface thereof. Hereinafter, the structure of the front surface of each of the outer electrodes 14a and 14b is described with reference to the drawing. FIG. 3 is a sectional structure diagram of the outer electrode 14a.

As shown in FIG. 3, the irregularities are formed on the surface of the outer electrode 14a. Hence, the surface area of the outer electrode 14a is increased. If the surface area of the outer electrode 14a is increased, when the electronic component 10a is mounted on a circuit board, the area of solder that comes into contact with the outer electrode 14a is increased. As the result, when the solder is liquefied in a reflowing step, an attraction force by which the solder holds the outer electrode 14a is increased. Accordingly, in the reflowing step, the electronic component 10a is prevented from being shifted from a normal mount position.

To form the above-described irregularities on the surface of the outer electrode 14a, in the electronic component 10a, the exposure portions P1 are not arranged at uniform intervals in the x-axis direction as shown in FIG. 3. More specifically, the insulating layers 16 do not have uniform thicknesses. In particular, as shown in FIG. 3, the insulating layers 16c, 16d, 16g, and 16h each have a thickness d1. In contrast, the insulating layers 16e, 16f, 16i, and 16j each have a thickness d2 that is smaller than d1. Also, the connection conductors 20c to 20i each have a thickness t1. Accordingly, an interval between the exposure portions P1 of the connection conductors 20b and 20c, an interval between the exposure portions P1 of the connection conductors 20c and 20d, an interval between the exposure portions P1 of the connection conductors 20f and 20g, and an interval between the exposure portions P1 of the connection conductors 20g and 20h are larger than an interval between the exposure portions P1 of the connection conductors 20d and 20e, an interval between the exposure portions P1 of the connection conductors 20e and 20f, an interval between the exposure portions P1 of the connection conductors 20h and 20i, and an interval between the exposure portions P1 of the connection conductors 20i and 20j.

As described above, since the exposure portions P1 are not arranged at uniform intervals, a region where the exposure portions P1 are present with a relatively high density and a region where the exposure portions P1 are present with a relatively low density are formed. In FIG. 3, in the region provided with the connection conductors 20d to 20f, the exposure portions P1 are present with a relatively high density, and in the region provided with the connection conductor 20c, the exposure portions P1 are present with a relatively low density. The outer electrode 14a is formed by a plating step. Hence, the outer electrode 14a is likely formed in the region where the exposure portions P1 are present with a relatively high density, and the outer electrode 14a is hardly formed in the region where the exposure portions P1 are present with a relatively low density. Accordingly, the thickness of the outer electrode 14a, which is shown in FIG. 3 as h1, is relatively large in the region where the exposure portions P1 are present with a relatively high density; and the thickness of the outer electrode 14a, which is shown in FIG. 3 as h2 such that h2<h1, is relatively small in the region where the exposure portions P1 are present with a relatively low density. In this way, the irregularities are formed on the surface of the outer electrode 14a. The irregularities are formed on the surface of the outer electrode 14b by the same reason as the reason of the formation of the irregularities on the surface of the outer electrode 14a. Therefore, a description thereof will not be repeated here.

An exemplary manufacturing method of the electronic component 10a is described below with reference to the drawing. In the following, the manufacturing method of the electronic component 10a is described where a plurality of the electronic components 10a are simultaneously manufactured.

First, respective ceramic green sheets are prepared, which become the insulating layers 16 in FIG. 2. More specifically, respective materials of ferric oxide ($Fe_2O_3$), zinc oxide (ZnO), copper oxide (CuO), and nickel oxide (NiO) are weighed according to a predetermined ratio, the materials as raw materials are put into a ball mill, and the materials are mixed in wet condition. The obtained mixture is dried and then crushed, and the obtained powder is temporarily sintered at 800° C. for one hour. The obtained temporarily sintered powder is crushed by a ball mill in wet condition, dried, and then disintegrated to obtain ferrite ceramic powder.

A binder (vinyl acetate, water-soluble acryl, etc.), a plasticizer, a humectant, and a dispersant are added to the ferrite ceramic powder and the powder and the added agents are mixed by a ball mill. Then, defoaming is performed by decompression. The obtained ceramic slurry is provided in a sheet form on a carrier sheet by a doctor blade method, and is dried, thereby fabricating a ceramic green sheet, which becomes each of the insulating layers 16.

Then, as shown in FIG. 2, the via-hole conductors v1 to v18, v21 to v38, and v41 to v58 are formed in the respective ceramic green sheets, which become the insulating layers 16b to 16s. More specifically, the respective ceramic green sheets, which become the insulating layers 16b to 16s, are irradiated with a laser beam, and hence via holes are formed. Then, the via holes are filled with conductive paste, such as Ag, Pd, Cu, Au, or an alloy including any one of these metals, by a method such as application by printing.

Next, as shown in FIG. 2, the coil conductors 18a to 18s and the connection conductors 20a to 20s and 22a to 22s are formed on the front surfaces of the respective ceramic green sheets, which become the insulating layers 16a to 16s. More specifically, the coil conductors 18a to 18s and the connection conductors 20a to 20s and 22a to 22s are formed by applying conductive paste made of Ag, Pd, Cu, Au, or an alloy including any one of these metals as a principal component on each of the front surfaces of the respective ceramic green sheets, which become the insulating layers 16a to 16s, by screen printing, photolithography, etc. Alternatively, the step of forming the coil conductors 18a to 18s and the connection conductors 20a to 20s and 22a to 22s and the step of filling the via holes with the conductive paste may be performed in the same step.

Then, as shown in FIG. 2, the respective ceramic green sheets, which become the insulating layers 16a to 16s, are stacked and press-bonded in that order, and hence an unfired mother stack is obtained. Stacking and press-bonding of the respective ceramic green sheets, which become the insulating layers 16a to 16s, are performed such that a mother stack is obtained by stacking the ceramic green sheets one by one and temporarily press-bonding the ceramic green sheets and then the unfired mother stack is finally press-bonded by pressing with a hydraulic press etc.

Then, the mother stack is cut into stacks 12 each having predetermined dimensions by a cutting blade. Accordingly, the stack 12 in which the connection conductors 20 and 22 are exposed from the lower surface S10 is obtained.

Then, binder removing processing and firing are performed on the unfired stack 12. Binder removing processing is performed, for example, under conditions at 500° C. for 2 hours in low oxygen atmosphere. Firing is performed, for example, under conditions at temperatures from 800° C. to 900° C. for 2.5 hours.

Then, the outer electrodes 14a and 14b are formed by plating of Ni/Sn plating so that the exposure portions P1 and P2 of the connection conductors 20 and 22 exposed from the lower surface S10 are covered with the outer electrodes 14a and 14b. The outer electrodes 14a and 14b may be formed by plating with metal other than Ni and Sn or an alloy. With the above steps, the electronic component 10a as shown in FIG. 1 is completed.

In the above-described electronic component 10a, as shown in FIG. 3, the irregularities are formed on the surfaces of the outer electrodes 14a and 14b. Hence, the surface area of the outer electrodes 14a and 14b is increased. If the surface area of the outer electrodes 14a and 14b is increased, when the electronic component 10a is mounted on the circuit board, the area of solder that comes into contact with the outer electrodes 14a and 14b is increased. As the result, when the solder is liquefied in the reflowing step, the force by which the solder holds the outer electrodes 14a and 14b because of a surface tension is increased. Accordingly, in the reflowing step, the electronic component 10a is prevented from being shifted from the normal mount position.

Further, in the electronic component 10a, the insulating layers 16 with the uneven thicknesses are used to form the irregularities on the surfaces of the outer electrodes 14a and 14b. Accordingly, the pattern of the meshlike mold is no longer required to be transferred to the outer electrodes 14a and 14b after the outer electrodes 14a and 14b are formed. Thus, the number of manufacturing steps of the electronic component 10a can be decreased, and the electronic component 10a can be manufactured with a low cost.

Figure 4:
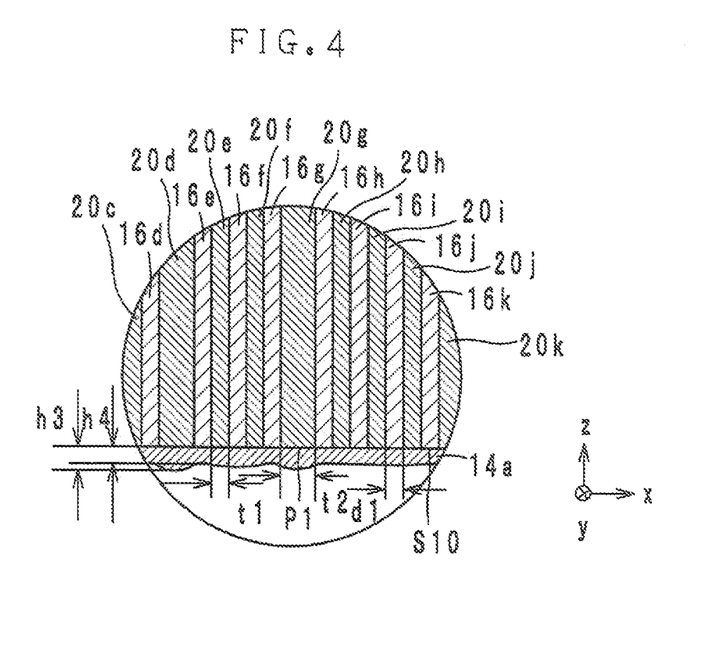
FIG. 4 is a sectional structure diagram of an outer electrode of an electronic component according to a first exemplary modification.

Hereinafter, an electronic component 10b according to a first exemplary modification is described below with reference to the drawings. FIG. 4 is a sectional structure diagram of an outer electrode 14a of the electronic component 10b according to the first modification. FIGS. 1 and 2 are also referenced for the external perspective view of the electronic component 10b and for the exploded perspective view of the stack of the electronic component 10b.

To form irregularities on the surface of the outer electrode 14a, in the electronic component 10a, the exposure portions P1 are not arranged at uniform intervals in the x-axis direction as shown in FIG. 3. In contrast, in the electronic component 10b, to form irregularities on the surface of the outer electrode 14a, exposure portions P1 do not have uniform thicknesses in the z-axis direction as described below.

More specifically, the connection conductors 20 do not have uniform thicknesses. In particular, as shown in FIG. 4, the connection conductors 20e, 20f, 20h, 20i, and 20j each have a thickness t1. In contrast, the connection conductors 20c, 20d, 20g, and 20k each have a thickness of t2. Also, the insulating layers 16 each have a thickness d1.

As described above, since the exposure portions P1 do not have uniform thicknesses, a region where the exposure portions P1 are present with a relatively high density and a region where the exposure portions P1 are present with a relatively low density are formed. In FIG. 4, in the region provided with the connection conductors 20c, 20d, 20g, and 20k, the exposure portions P1 are present with a relatively high density, and in the region provided with the connection conductors 20e, 20f, 20h, 20i, and 20j, the exposure portions P1 are present with a relatively low density. The outer electrode 14a is formed by a plating step. Hence, the outer electrode 14a is likely formed in the region where the exposure portions P1 are present with a relatively high density, and the outer electrode 14a is hardly formed in the region where the exposure portions P1 are present with a relatively low density. Accordingly, the thickness of the outer electrode 14a, which is shown in FIG. 4 as h3, is relatively large in the region where the exposure portions P1 are present with a relatively high density; and the thickness of the outer electrode 14a, which is shown in FIG. 4 as h4 such that h4<h3, is relatively small in the region where the exposure portions P1 are present with a relatively low density. In this way, the irregularities are formed on the surface of the outer electrode 14a. The irregularities are formed on the surface of an outer electrode 14b by the same reason as the reason of the formation of the irregularities on the surface of the outer electrode 14a. Therefore, description thereof will not be repeated here.

The coil conductors 18 and the connection conductors 20 and 22 are formed by screen printing. Hence, the coil conductor 18 and the connection conductors 20 and 22 provided on the same insulating layer 16 have the same thicknesses. Hence, in the electronic component 10b, the coil conductors 18 also have uneven thicknesses in the x-axis direction.

Figure 5:
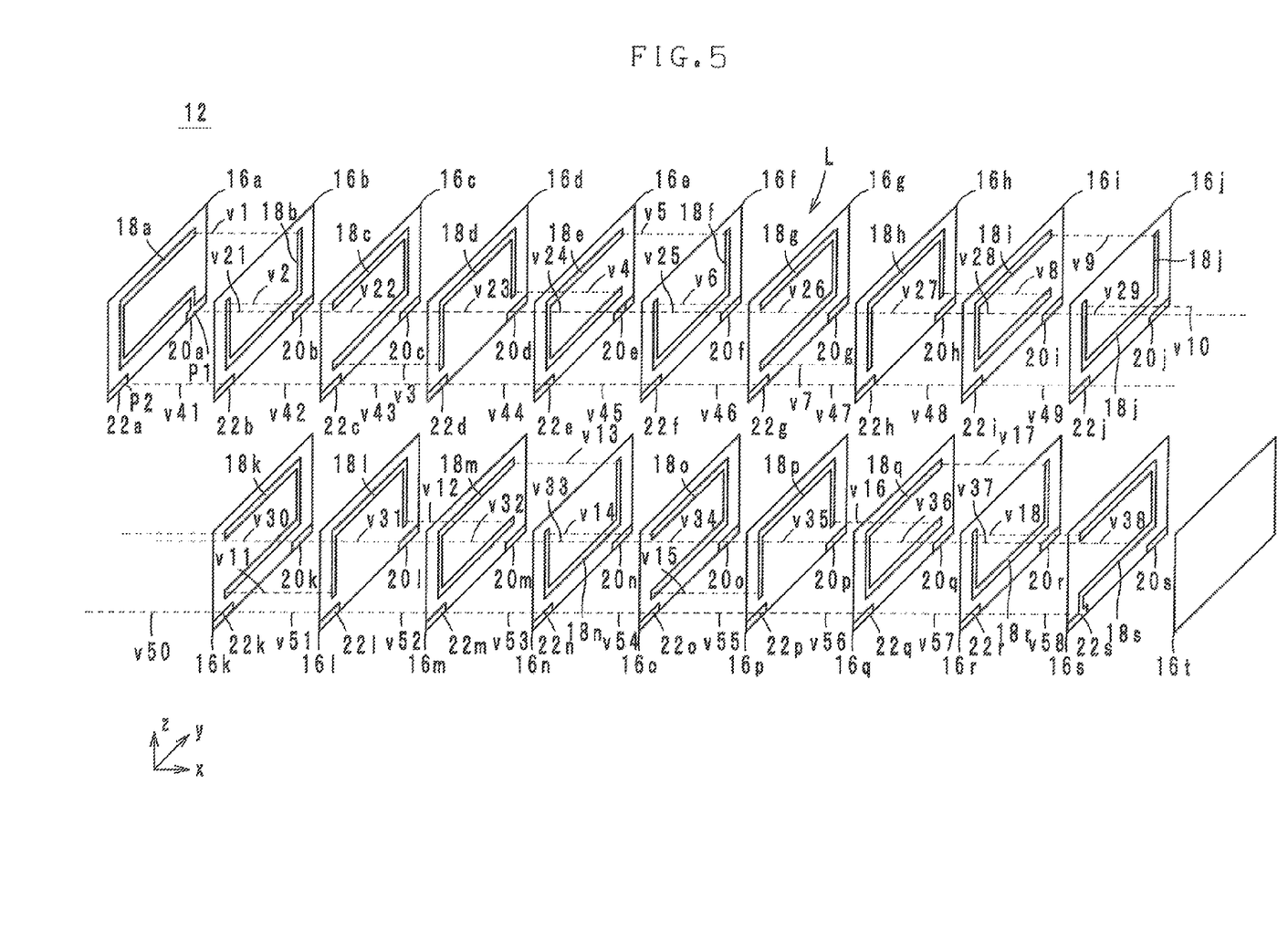
FIG. 5 is an exploded perspective view of a stack of an electronic component according to a second exemplary modification.

Hereinafter, an electronic component 10c according to a second exemplary modification is described below with reference to the drawing. FIG. 5 is an exploded perspective view of a stack 12 of the electronic component 10c according to the second exemplary modification.

The electronic component 10c differs from the electronic component 10a in the configuration of the outer electrodes 14a and 14b. For other points, the electronic component 10c is similar to the electronic component 10a, and hence description thereof will not be repeated here.

In the electronic component 10c, an outer electrode 14a is provided on an end surface at the positive side in the y-axis direction of the stack 12, in addition to the lower surface S10. Similarly, an outer electrode 14b is provided on an end surface at the negative side in the y-axis direction of the stack 12, in addition to the lower surface S10. That is, the outer electrodes 14a and 14b each have an L shape.

In the electronic component 10c, the connection conductors 20a to 20s are adjacent to the respective short sides at the positive side in the y-axis direction of the insulating layers 16a to 16s so that the above-described outer electrodes 14a and 14b are formed. Also, the connection conductors 22a to 22s are adjacent to the respective short sides at the negative side in the y-axis direction of the insulating layers 16a to 16s. Accordingly, the connection conductors 20a to 20s and 22a to 22s are exposed from the end surfaces at the positive side and the negative side in the y-axis direction of the stack 12. Thus, the outer electrodes 14a and 14b are formed by plating so as to have the L shapes.

Figure 6:
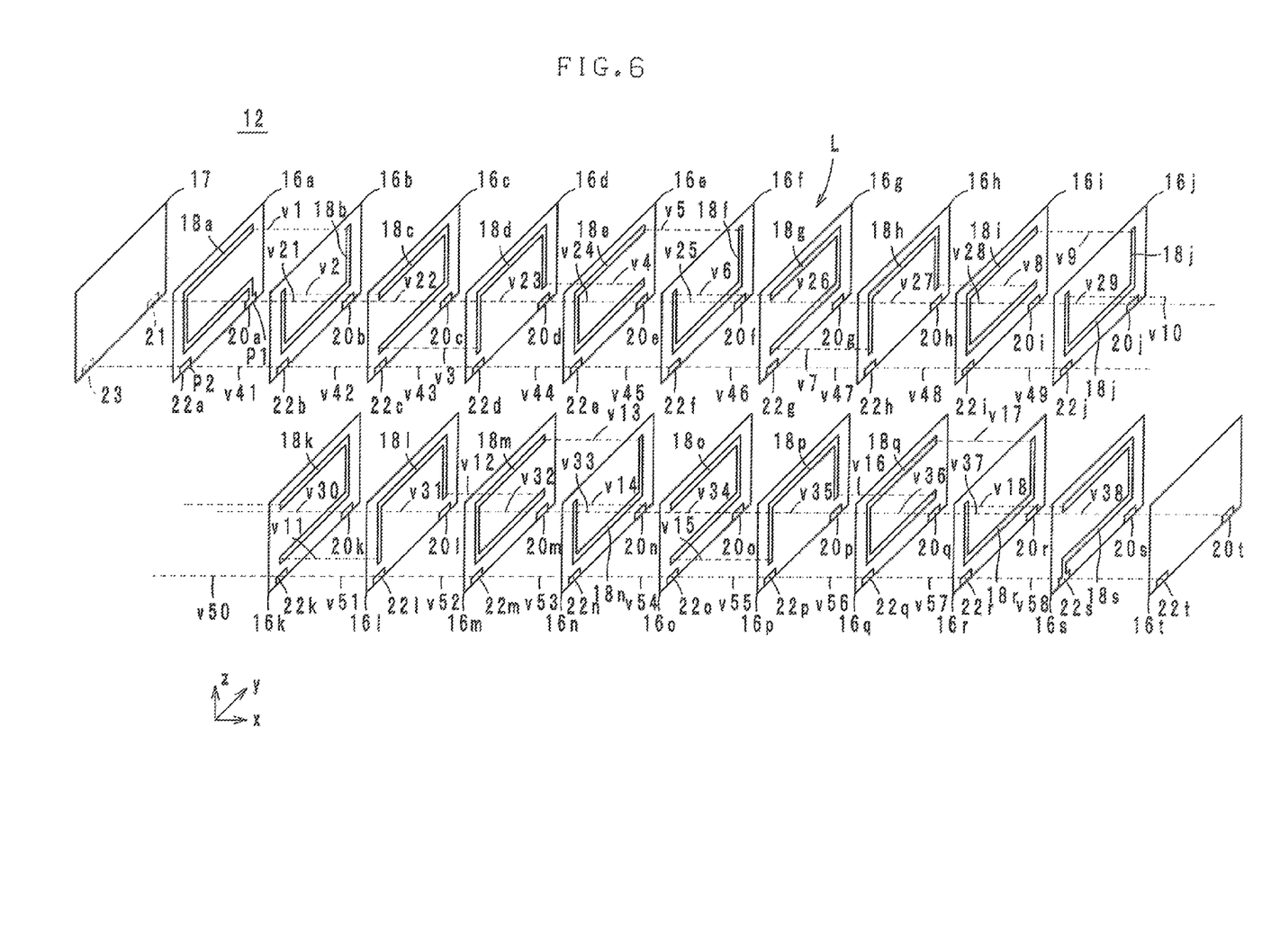
FIG. 6 is an exploded perspective view of a stack of an electronic component according to a third exemplary modification.

Hereinafter, an electronic component 10d according to a third exemplary modification is described below with reference to the drawing. FIG. 6 is an exploded perspective view of a stack 12 of the electronic component 10d according to the third exemplary modification.

The electronic component 10d differs from the electronic component 10a in the configuration of the outer electrodes 14a and 14b. For other points, the electronic component 10d is similar to the electronic component 10a, and hence description thereof will not be repeated here.

In the electronic component 10d, the outer electrodes 14a and 14b are each provided on end surfaces at the positive side and the negative side in the x-axis direction of the stack 12, in addition to the lower surface S10. That is, the outer electrodes 14a and 14b each have an angular C shape.

In the electronic component 10d, an insulating layer 17 is provided at the negative side in the x-axis direction with respect to the insulating layer 16a so that the above-described outer electrodes 14a and 14b are formed. Connection conductors 21 and 23 are provided on the back surface of the insulating layer 17. The connection conductors 21 and 23 are superposed on the connection conductors 20 and 22, respectively, in an aligned manner. Also, connection conductors 20t and 22t are provided on the front surface of the insulating layer 16t. Accordingly, the outer electrodes 14a and 14b are formed by plating so as to have the angular C shapes.

Figure 7:
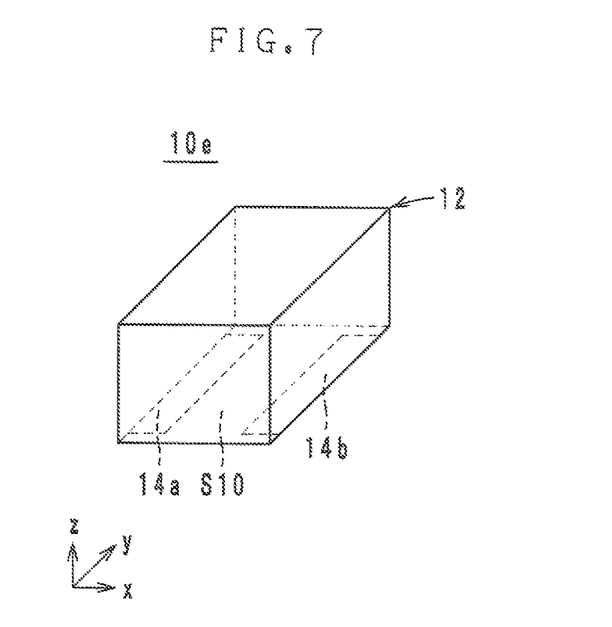
FIG. 7 is an external perspective view of an electronic component according to a second exemplary embodiment.
Figure 8:
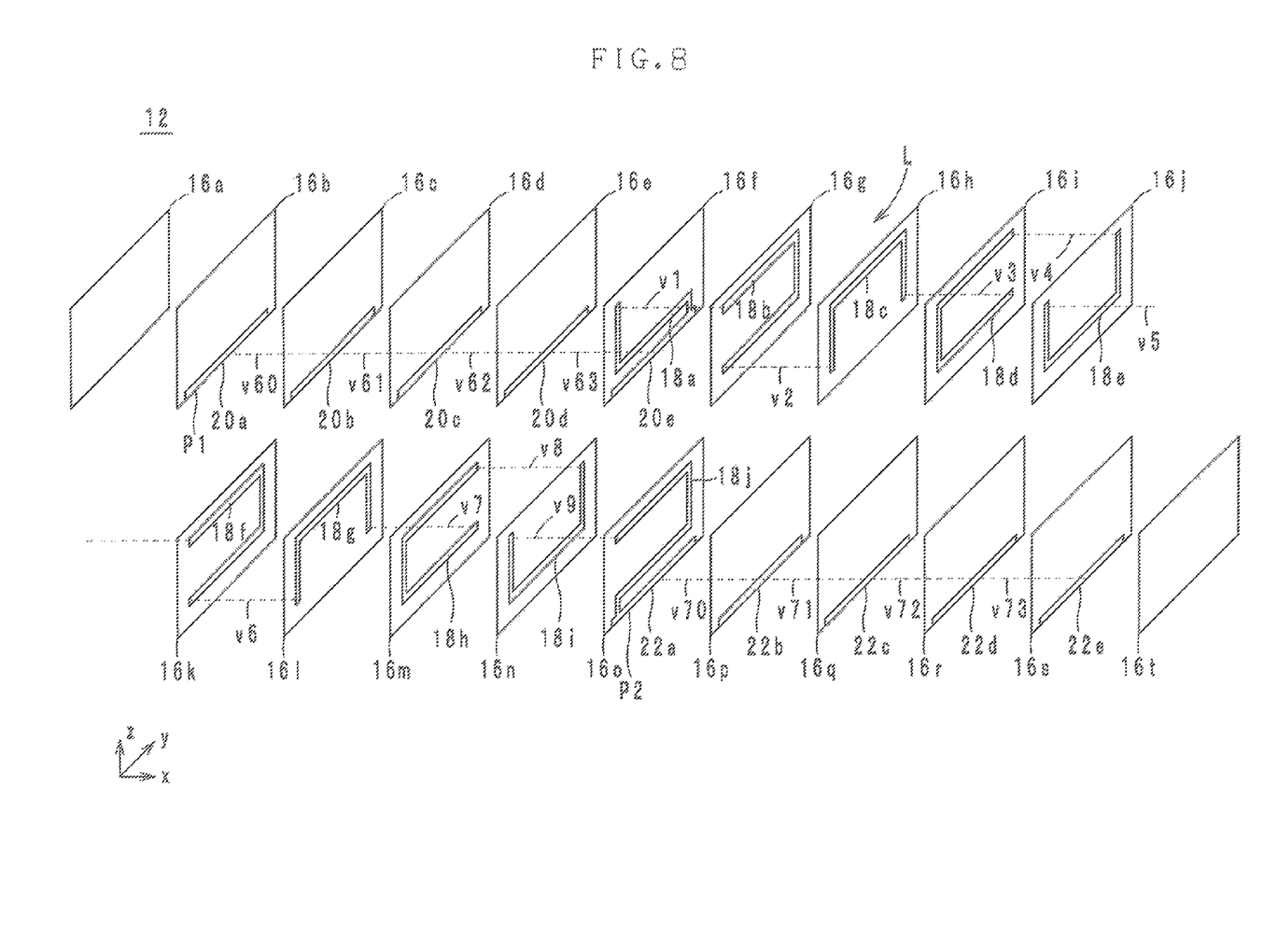
FIG. 8 is an exploded perspective view of a stack of the electronic component according to the second exemplary embodiment.

An electronic component according to a second exemplary embodiment will now be described with reference to the drawings. FIG. 7 is an external perspective view of an electronic component 10e according to the second embodiment. FIG. 8 is an exploded perspective view of a stack 12 of the electronic component 10e according to the second embodiment. Hereinafter, a stacking direction of the electronic component 10e is defined as an x-axis direction, and in plan view in the x-axis direction, a direction extending along the short side of the electronic component 10e is defined as a z-axis direction, and a direction extending along the long side of the electronic component 10e is defined as a y-axis direction. The x axis, y axis, and z axis are orthogonal to one another.

As shown in FIGS. 7 and 8, the electronic component 10e includes the stack, or a body 12, outer electrodes 14a and 14b, which are sometimes collectively referred to herein as outer electrodes 14, connection conductors (inner conductors) 20a to 20e and 22a to 22e, which are sometimes collectively referred to herein as connection conductors 20 and connection conductors 22, respectively, a coil L, and via-hole conductors v60 to v63 and v70 to v73.

The stack 12 has a rectangular-parallelepiped shape, and is embedded with the connection conductors 20 and 22, the coil L, and the via-hole conductors v60 to v63 and v70 to v73. Hereinafter, a surface at the negative side in the z-axis direction of the stack 12 is defined as a lower surface S10.

As shown in FIG. 8, the stack 12 is configured by stacking insulating layers 16a to 16t, which are sometimes collectively referred to as insulating layers 16, in that order from the negative side to the positive side in the x-axis direction. The insulating layers 16 each have a rectangular shape, and are each fabricated with a magnetic material. Hereinafter, a surface at the positive side in the x-axis direction of each insulating layer 16 is referred to as front surface, and a surface at the negative side in the x-axis direction of each insulating layer 16 is referred to as back surface.

As shown in FIG. 8, the coil L is configured by coil conductors (inner conductors) 18a to 18j, which are sometimes collectively referred to herein as coil conductors 18, and via-hole conductors v1 to v9. That is, the coil L is configured such that the coil conductors 18a to 18j are connected in series by the via-hole conductors v1 to v9. The coil L has a coil axis extending in the x-axis direction. The coil L has a helix shape extending from the negative side to the positive side in the x-axis direction while turning clockwise.

As shown in FIG. 8, the coil conductors 18a to 18j are provided on the front surfaces of the insulating layers 16f to 16o, respectively. The coil conductors 18b to 18j are each formed of a conductive material, each have a number of turns being ¾ turn. In addition, the coil conductors 18b to 18j each have a shape in which a linear conductor is bent. However, the coil conductor 18a has a number of turns being ½ turn. That is, the coil conductors 18a to 18j each have a shape in which part of a rectangular ring-shaped conductor is cut. Hereinafter, regarding the coil conductors 18a to 18j, an end at the upstream side in the clockwise direction is called upstream end, and an end at the downstream side in the clockwise direction is called downstream end.

The via-hole conductors v1 to v9 penetrate through the insulating layers 16g to 16o in the x-axis direction, respectively, and connect the coil conductors 18a to 18j in series. To be more specific, the via-hole conductor v1 connects the downstream end of the coil conductor 18a to the upstream end of the coil conductor 18b. The via-hole conductor v2 connects the downstream end of the coil conductor 18b to the upstream end of the coil conductor 18c. The via-hole conductor v3 connects the downstream end of the coil conductor 18c to the upstream end of the coil conductor 18d. The via-hole conductor v4 connects the downstream end of the coil conductor 18d to the upstream end of the coil conductor 18e. The via-hole conductor v5 connects the downstream end of the coil conductor 18e to the upstream end of the coil conductor 18f. The via-hole conductor v6 connects the downstream end of the coil conductor 18f to the upstream end of the coil conductor 18g. The via-hole conductor v7 connects the downstream end of the coil conductor 18g to the upstream end of the coil conductor 18h. The via-hole conductor v8 connects the downstream end of the coil conductor 18h to the upstream end of the coil conductor 18i. The via-hole conductor v9 connects the downstream end of the coil conductor 18i to the upstream end of the coil conductor 18j.

The connection conductors 20a to 20e are rectangular conductive layers provided on the front surfaces of the insulating layers 16b to 16f, respectively, such that the connection conductors 20a to 20e are adjacent to the respective long sides at the negative side in the z-axis direction. Hence, the connection conductors 20a to 20e each have an exposure portion P1 that is exposed between the corresponding insulating layers 16 at the lower surface S10 of the stack 12. In FIG. 8, a reference sign is applied only to the exposure portion P1 of the connection conductor 20a for simplifying illustration.

Also, the connection conductors 20a to 20e are superposed on one another in an aligned manner in plan view in the x-axis direction. Accordingly, when the insulating layers 16 are stacked, the connection conductors 20a to 20e are exposed from the lower surface S10 within the rectangular region. Further, as shown in FIG. 8, the connection conductor 20e is connected to the upstream end of the coil conductor 18a.

The via-hole conductors v60 to v63 penetrate through the insulating layers 16c to 16f in the x-axis direction, respectively, and are connected in series, thereby configuring a single via-hole conductor. As shown in FIG. 8, the via-hole conductors v60 to v63 connect the connection conductors 20a to 20e.

The connection conductors 22a to 22e are rectangular conductive layers provided on the front surfaces of the insulating layers 16o to 16s, respectively, such that the connection conductors 22a to 22e are adjacent to the respective long sides at the negative side in the z-axis direction. Hence, the connection conductors 22a to 22e each have an exposure portion P2 that is exposed between the corresponding insulating layers 16 at the lower surface S10 of the stack 12. In FIG. 8, a reference sign is applied only to the exposure portion P2 of the connection conductor 22a for simplifying illustration.

The connection conductors 22a to 22e are located at the positive side in the x-axis direction with respect to the connection conductors 20a to 20e, respectively. Also, the connection conductors 20a to 20e and 22a to 22e are superposed on one another in an aligned manner in plan view in the x-axis direction. Accordingly, when the insulating layers 16 are stacked, the connection conductors 22a to 22e are exposed from the lower surface S10 within the rectangular region at the positive side in the x-axis direction with respect to the connection conductors 20a to 20e. Further, as shown in FIG. 8, the connection conductor 22a is connected to the downstream end of the coil conductor 18j.

The via-hole conductors v70 to v73 penetrate through the insulating layers 16p to 16s in the x-axis direction, respectively, and are connected to one another, thereby configuring a single via-hole conductor. As shown in FIG. 8, the via-hole conductors v70 to v73 connect the connection conductors 22a to 22e.

As shown in FIG. 7, the outer electrodes 14a and 14b are provided on the lower surface S10 of the stack 12 to be arranged in the x-axis direction. The outer electrode 14b is provided at the positive side in the x-axis direction with respect to the outer electrode 14a. The outer electrode 14a is a rectangular conductor formed on the lower surface S10 by plating so that the exposure portions P1 of the connection conductors 20a to 20e in FIG. 8 are covered with the outer electrode 14a. The outer electrode 14b is a rectangular conductor formed on the lower surface S10 by plating so that the exposure portions P2 of the connection conductors 22a to 22e in FIG. 8 are covered with the outer electrode 14b.

The outer electrodes 14a and 14b are each provided with irregularities in the respective surfaces. However, the formation method of the irregularities on the outer electrodes 14a and 14b of the electronic component 10e is similar to the formation method of the irregularities on the electronic component 10a, and hence further detailed description thereof will not be provided. Also, the manufacturing method of the electronic component 10e can be similar to the above manufacturing method of the electronic component 10a, and hence a description thereof will not be provided.

With the above-described electronic component 10e, the electronic component 10e is prevented from being shifted from the normal mount position in the reflowing step, like the electronic component 10a.

Further, with the electronic component 10e, the number of manufacturing steps of the electronic component 10e can be decreased, and the electronic component 10e can be manufactured with a low cost, like the electronic component 10a.

In the electronic component 10e, the outer electrodes 14a and 14b may each have an L shape or an angular C shape in a manner similar to the electronic component 10b or 10c.

The electronic components 10a to 10e are each embedded with the coil L as a circuit element. However, the circuit element is not limited to the coil L, and may be another element, such as a capacitor or a resistor.

In each of the electronic components 10a to 10e, the exposure portions P1 and P2 may not have uniform thicknesses or may not be arranged at uniform intervals.

As described above, an embodiment consistent with the present disclosure is useful for an electronic component, and is excellent particularly in that shifting from the normal mount position can be prevented, and manufacturing with a low cost can be attained.

That which is claimed is:

1. An electronic component, comprising:
   a stack configured by stacking a plurality of insulating layers;
   a plurality of inner conductors provided on the respective insulating layers, the plurality of inner conductors having respective exposure portions that are each exposed between the corresponding insulating layers at a surface of the stack; and
   an outer electrode on the surface covering the exposure portions,
   wherein the plurality of exposure portions of the inner conductors do not have uniform thicknesses or are not arranged at uniform intervals in a stacking direction.

2. The electronic component according to claim 1, wherein the surface is a mount surface.

3. The electronic component according to claim 1, wherein the surface is parallel to the stacking direction.

4. The electronic component according to claim 2, wherein the surface is parallel to the stacking direction.

5. The electronic component according to claim 1, wherein irregularities are formed on a surface of the outer electrode.

6. The electronic component according to claim 5, wherein each irregularity comprises a region having a thickness greater than a thickness of a region of the outer electrode adjacent to the irregularity.

7. The electronic component according to claim 1, wherein the outer electrode is formed by plating on the surface.

8. The electronic component according to claim 1, wherein the outer electrode covers portions of the insulating layers between the inner conductors.

9. The electronic component according to claim 1, further comprising:
   a coil provided in the stack and having at least one end connected to the outer electrode via one of the inner electrodes.

10. The electronic component according to claim 1, wherein the irregularities are formed on a surface of the outer electrode depending on the plurality of exposure portions that do not have uniform thicknesses or are not arranged at uniform intervals in a stacking direction.

11. An electronic component, comprising:
    a stack configured by stacking a plurality of insulating layers;
    a plurality of first inner conductors provided on the respective insulating layers, the plurality of first inner conductors having respective exposure portions that are each exposed between the corresponding insulating layers at a surface of the stack;
    an outer electrode on the surface covering the exposure portions, and
    a plurality of second inner conductors provided in the stack without exposing at the surface thereof and connected to the outer electrode via one of the first inner electrodes,
    wherein the plurality of exposure portions of the inner conductors do not have uniform thicknesses or are not arranged at uniform intervals in a stacking direction.

* * * * *